(12) United States Patent
Jiang et al.

(10) Patent No.: US 12,381,820 B2
(45) Date of Patent: Aug. 5, 2025

(54) DATA PROCESSING METHOD AND SYSTEM, ENCAPSULATION NODE, AND DE-ENCAPSULATION NODE

(71) Applicant: ZTE CORPORATION, Guangdong (CN)

(72) Inventors: Haiming Jiang, Guangdong (CN); Mingjun Gu, Guangdong (CN); Hong Tang, Guangdong (CN); Yongqing Zhu, Guangdong (CN)

(73) Assignee: ZTE CORPORATION, Guangdong (CN)

(*) Notice: Subject to any disclaimer, the term of this patent is extended or adjusted under 35 U.S.C. 154(b) by 370 days.

(21) Appl. No.: 18/027,936

(22) PCT Filed: Aug. 3, 2021

(86) PCT No.: PCT/CN2021/110348
§ 371 (c)(1),
(2) Date: Mar. 23, 2023

(87) PCT Pub. No.: WO2022/062679
PCT Pub. Date: Mar. 31, 2022

(65) Prior Publication Data
US 2023/0370375 A1    Nov. 16, 2023

(30) Foreign Application Priority Data
Sep. 24, 2020   (CN) .................. 202011014205.7

(51) Int. Cl.
*H04L 45/745*   (2022.01)
(52) U.S. Cl.
CPC ........ *H04L 45/745* (2013.01); *H04L 2212/00* (2013.01)
(58) Field of Classification Search
CPC .................. H04L 45/745; H04L 2212/00
See application file for complete search history.

(56) References Cited

U.S. PATENT DOCUMENTS

| | | | |
|---|---|---|---|
| 7,822,033 B1 * | 10/2010 | Parker | H04L 49/354 370/392 |
| 2015/0188815 A1 * | 7/2015 | Liu | H04L 45/741 370/392 |

(Continued)

FOREIGN PATENT DOCUMENTS

| | | | | |
|---|---|---|---|---|
| CN | 103870492 A | 6/2014 | | |
| CN | 111930757 A * | 11/2020 | ......... | G06F 16/2228 |

(Continued)

OTHER PUBLICATIONS

Bonica Juniper W Cheng China Mobile D Dukes R et al: "Compressed SRv6 SID List Analysis draft-ietf-spring-compression-analysis-02 ; draft-ietf-spring-compression-analysis-02 .txt", Compressed SRV6 SID List Analysis DRAFT-IETF-SPRING-COMPRESSION-ANALYSIS-02 ; DRAFT-IETF-SPRING-COMPRESSION-ANALYSIS-02 .TXT ; Internet-Draft: Abstract, Internet Engineering Task Force, IETF ; STANDARDWOR.

(Continued)

*Primary Examiner* — Shean Tokuta
(74) *Attorney, Agent, or Firm* — NZ Carr Law Office

(57) ABSTRACT

Disclosed is a data processing method and system, an encapsulation node, and a de-encapsulation node. The data processing method comprises: obtaining at least two sets of data to be sent, wherein the data comprises prefix data and suffix data; obtaining public prefix data from the prefix data; obtaining a local index based on the public prefix data, and writing the local index and the public prefix data into a preset prefix table; writing the suffix data and the local index into a preset suffix table; and writing the data in the prefix table and the data in the suffix table into a preset data encapsulation table, and sending the data encapsulation table.

10 Claims, 5 Drawing Sheets

(56) References Cited

U.S. PATENT DOCUMENTS

| | | | |
|---|---|---|---|
| 2022/0124027 A1* | 4/2022 | Du | H04L 45/34 |
| 2022/0182323 A1* | 6/2022 | Hu | H04L 49/3009 |
| 2022/0263753 A1* | 8/2022 | Zhang | H04L 45/50 |
| 2022/0263758 A1* | 8/2022 | Zhang | H04L 45/50 |
| 2023/0006921 A1* | 1/2023 | Wang | H04L 45/74 |
| 2023/0370375 A1* | 11/2023 | Jiang | H04L 45/745 |

FOREIGN PATENT DOCUMENTS

| | | | | |
|---|---|---|---|---|
| CN | 112187649 A | * | 1/2021 | H04L 45/123 |
| CN | 112787921 A | * | 5/2021 | H04L 45/28 |
| CN | 112787931 A | * | 5/2021 | H04L 12/12 |
| CN | 110266594 B | * | 7/2021 | H04L 45/20 |
| CN | 113364676 A | * | 9/2021 | H04L 45/02 |
| CN | 113556284 A | * | 10/2021 | H04L 45/34 |
| CN | 115396354 A | * | 11/2022 | |
| EP | 2890064 B1 | * | 3/2017 | H04L 45/741 |
| WO | WO-2019205799 A1 | * | 10/2019 | H04L 12/18 |
| WO | WO-2021036328 A1 | * | 3/2021 | H04L 45/34 |

OTHER PUBLICATIONS

Li C Li Huawei Technologies C Xie China Telecom K Lee Lg U+ H Tian F Zhao Caict J Guichard Futurewei Technologies C Li China Telec: "Compressed SRv6 Network Programming; draft-li-spring-compressed-srv6-np-02.txt", Compressed SRV6 Network Programming ; DRAFT-LI-SPRING-COMPRESSED-SRV6-NP-02.TXT.

Decraene Orange R Raszuk Bloomberg Z Li C Li Huawei Technologies B: "SRv6 vSID: Network Programming extension for variable length SIDs; draft-decraene-spring-srv6-vlsid-03.txt", SRV6 VSID: Network Programming Extension for Variable Length SIDS ; DRAFT-DECRAENE-SPRING-SRV6-VLSID-03.TXT.

The Extended European Search Report of the corresponding European patent application No. 21871056.4.

\* cited by examiner

DATA PROCESSING METHOD AND SYSTEM, ENCAPSULATION NODE, AND DE-ENCAPSULATION NODE

CROSS REFERENCE TO RELATED APPLICATIONS

The present application claims the priority of the Chinese patent application CN202011014205.7 filed on Sep. 24, 2020 and entitled "data processing method and system, encapsulation node, and de-encapsulation node", the entirety of which is incorporated herein by reference.

TECHNICAL FIELD

The present disclosure relates to the field of communication transmission, in particular to a data processing method and system, an encapsulation node, and a de-encapsulation node.

BACKGROUND

The future network is a network for the 5G era. Facing 5G network, network virtualization is the main development direction of carrier networks. Internet Protocol Version 6 (IPv6) based Segment Routing IPV6 (SRv6) adopts an existing IPv6 forwarding technology. In the SRv6, routed segments are directly identified by 128-bit IPv6 addresses, and some of the IPv6 addresses are defined as instantiated Segment IDs (SIDs). Each SID has its own explicit role and function. Through different SID operations, simple network virtualization has been realized. The traditional processing mode of SID data is to apply for an index for each SID data, in which case the created SID encapsulation table is a direct index table, and encapsulation indexes are written in a service prefix table, to perform lookup operation on the SID encapsulation table.

However, in SRv6, an SID will have a size of 128 bits, such that an encapsulation message required to encapsulate a complete SID is very long. Also, during de-encapsulation, the SID encapsulation table needs to be looked up several times, because only one SID can be obtained per table lookup. The increase in the length of encapsulation message and the number of table lookups during de-encapsulation increases the burden of encapsulation and de-encapsulation on a network equipment, and thus decreases the efficiency of network transmission.

SUMMARY

It is to provide a data processing method and system, an encapsulation node, and a de-encapsulation node, to achieve separate storage of data into tables during storage, such that a large amount of table entry space can be saved, thereby greatly reducing storage burden incurred at nodes.

In accordance with an aspect, an embodiment of the disclosure provides a data processing method, which includes steps of: obtaining at least two sets of data to be sent, which includes prefix data and suffix data; obtaining public prefix data from the prefix data; obtaining a local index based on the public prefix data, and writing the local index and the public prefix data into a preset prefix table; writing the suffix data and the local index into a preset suffix table; and writing the data in the prefix table and the data in the suffix table into a preset data encapsulation table, and sending the data encapsulation table.

In accordance with another aspect, an embodiment of the disclosure further provides a data processing method, which includes steps of: receiving a data encapsulation table, which includes public prefix data and suffix data; obtaining prefix data from a local data table; obtaining a local index based on the prefix data, and writing the local index into a preset public prefix table; and obtaining the data from the data encapsulation table through data in the preset public prefix table, the data including public prefix data and suffix data.

In accordance with a further aspect, an embodiment of the disclosure further provides an encapsulation node, which includes at least one processor and a memory in communication connection with the at least one processor. The memory stores instructions executable by the at least one processor, which instructions, when being executed by the at least one processor, cause the at least one processor to execute the above data processing method.

In accordance with a yet further aspect, an embodiment of the disclosure further provides a de-encapsulation node, which includes at least one processor and a memory in communication connection with the at least one processor. The memory stores instructions executable by the at least one processor, which instructions, when being executed by the at least one processor, cause the at least one processor to execute the above data processing method.

In accordance with a still yet further aspect, an embodiment of the disclosure provides a data processing system, which includes the above encapsulation node and the above de-encapsulation node.

BRIEF DESCRIPTION OF THE DRAWINGS

One or more embodiments are illustrated exemplarily through accompanying drawings that correspond thereto, and these exemplary illustrations do not constitute a limitation on the embodiments.

DETAILED DESCRIPTION

For clarifying the objectives, solutions and advantages of embodiments of the present disclosure, the embodiments of the disclosure will be described in detail below in conjunction with the accompanying drawings. However, those of ordinary skill in the art may readily appreciate that the disclosure become better understood by reference to the detailed description in the embodiments of the disclosure. However, even without those details and the various changes and modifications based on the following embodiments, it is possible to achieve the technical solution of the disclosure. The following embodiments are given merely for convenience of description and shall not constitute any limitation on the implementations of the disclosure. The embodiments can be combined and cross-referenced without contradicting each other.

Figure 1:
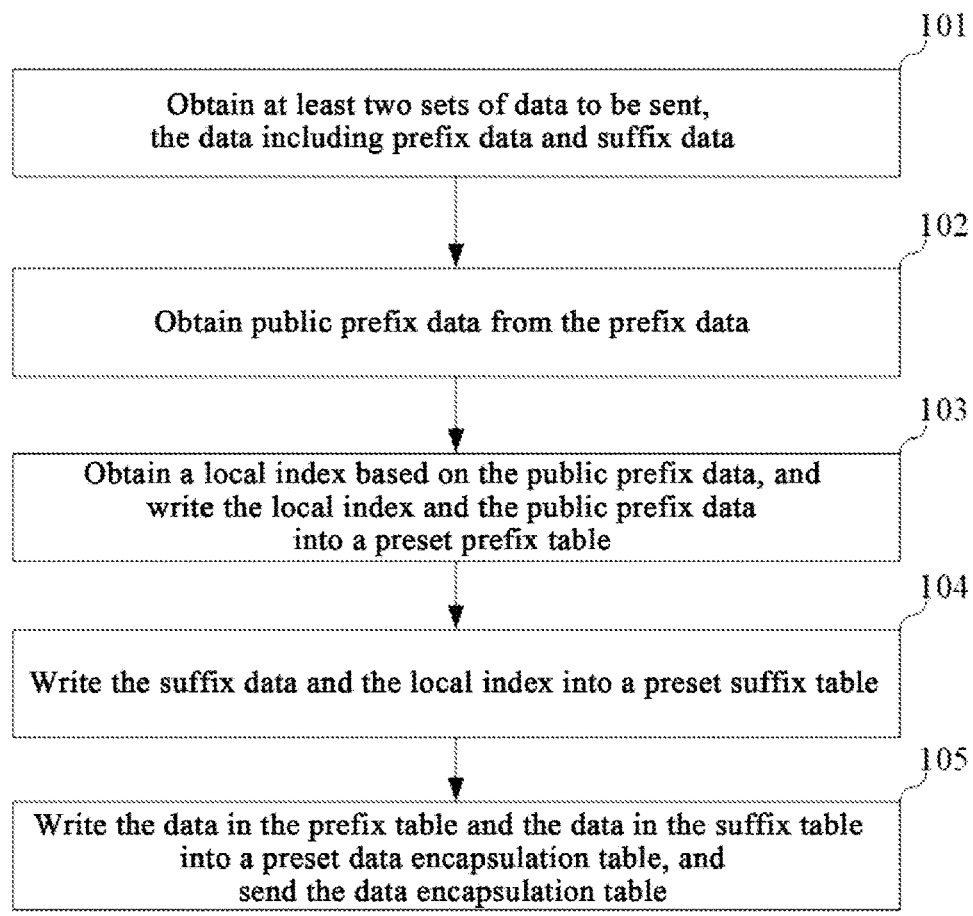
FIG. 1 is a flow chart of a data processing method provided by a first embodiment of the disclosure.

A first embodiment of the disclosure relates to a data processing method, as shown in FIG. 1, in particular including the following steps 101 to 105.

At step 101, at least two sets of data to be sent are obtained, which includes prefix data and suffix data.

Specifically, the data are composed of two parts, i.e., prefix data and suffix data, in a specific format of prefix data: suffix data, where the prefix data occupies higher bits of an IPV6 address, and the suffix data part occupies the remainder of the IPV6 address. Taking SID data as an example, the prefix data refers to Locator, which has a locating function. When a node in a system is equipped with such a Locator, the system will generate a piece of Locator segment routing, and the piece of Locator segment routing is diffused within a segment routing (SR) domain through an Interior Gateway Protocol (IGP). Other nodes in a network can locate this node through the Locator segment routing, and all SRv6SIDs published by this node can also be reached through segment routing corresponding to this Locator. In this example, the suffix data refers to Function, which stands for Instructions of an equipment, each of which is preset by the equipment and used to instruct generation nodes of the SID data to perform corresponding functional operations. There can also be an optional parameter field Arguments in the suffix data part. In this case, the format of the SID data becomes Locator: Function: Arguments, where Arguments occupies lower bits of the IPV6 addresses. Information, such as flows and services, of some messages can be defined through Arguments fields. However, both Function and Arguments can be used for definition.

At step 102, public prefix data of the prefix data is obtained.

Specifically, taking SID data as an example, although the prefix data is unique within the SR domain, in some cases (e.g., in an Anycast protection scenario), a plurality of equipments can be equipped with a same Locator, and thus at least one public prefix data can be extracted from the multiple sets of obtained SID data. If the obtained data includes 2002::0:0:0/96, 2002::1:0:0/96, 2002::2:0:0/96, 2001::0:0:0/95, 2001::1:0:0/95 and 2001::2:0:0/95, then the extracted public prefixes are 2002:: and 2001::. The above extracted data as well as the method and form for obtaining the public prefixes are only for the purpose of illustration, and in the practical application process of the disclosure, other data and methods can also be adopted, which will not be described in detail herein.

At step 103, based on the public prefix data, a local index is obtained, and the local index and the public prefix data are written into a preset prefix table.

Figure 2:
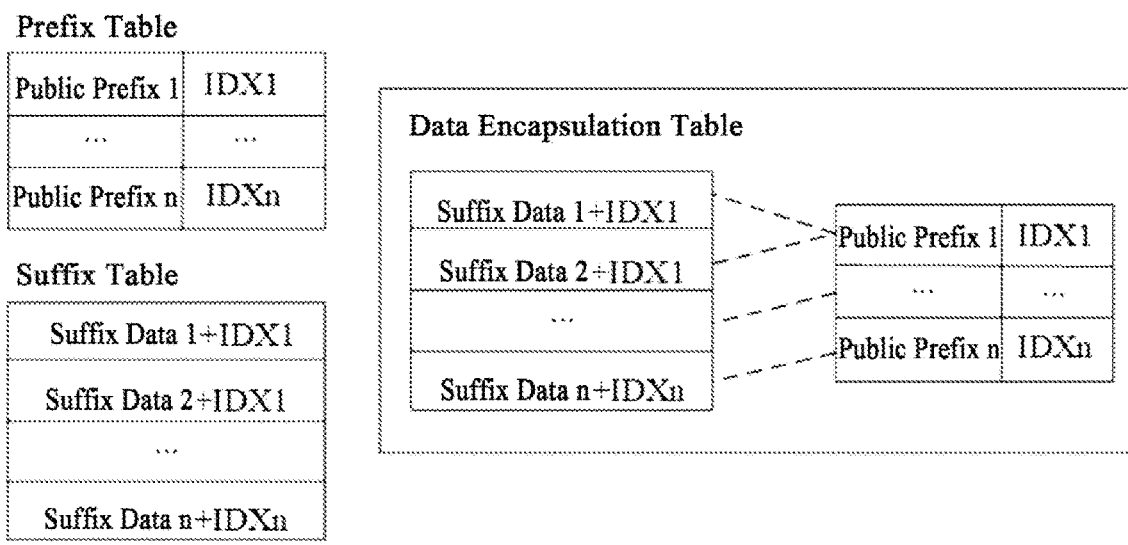
FIG. 2 is a schematic structural diagram of a preset prefix table, a preset suffix table and a preset data encapsulation table in the data processing method provided by the first embodiment of the disclosure, as shown in FIG. 1.

Specifically, the process of obtaining the local index through the public prefix data can be completed by using a software module, in which an algorithm is included. When the public prefix data is obtained, the number of bits occupied by the public prefix data needs to be obtained firstly, then based on the number of the occupied bits, the size of the obtained local index is selected, and the local index is obtained from local index resource management. Then, the input public prefix data together with the corresponding local index are written into the preset prefix table, and the preset prefix table can clearly reflect the corresponding relation between the local index and the public prefix data. The style of the preset prefix table is shown in FIG. 2, where Public Prefix n refers to a $n^{th}$ public prefix, and IDXn refers to the local index corresponding to the $n^{th}$ public prefix. The method for obtaining the local index mentioned above is only for the purpose of illustration, and in the practical application process of the disclosure, other methods can also be adopted, which will not be described in detail herein.

Preferably, step 103 further includes that when the public prefix data is deleted, the number of references to the local index corresponding to the public prefix data in the prefix table is reduced. For example, when the number of references to the local index is 0, the local index corresponding to the public prefix data in the prefix table is deleted.

Accordingly, when it is detected that the public prefix data is deleted and the number of references to the local index corresponding to the public prefix data is 0, the local index corresponding to the public prefix data is deleted, such that there can be a corresponding relation established between the local index and other public prefix data, thereby improving utilization of index resources.

At step 104, suffix data and the local index are written into a preset suffix table.

Specifically, the process of writing the suffix data and the local index into the preset suffix table includes that the prefix data corresponding to the suffix data is replaced with the local index corresponding to the prefix data to obtain new suffix data, where the new suffix data is composed of the local index and the suffix data, and then the new suffix data is written into the preset suffix table, which can clearly reflect the corresponding relation between the local index and the suffix data. The style of the preset suffix table is shown in FIG. 2, where Suffix Data n+IDXn in the suffix table refers to the new suffix data.

Accordingly, when the suffix data and the local index are written into the suffix table, the prefix data corresponding to the suffix data will be replaced with the local index corresponding to the prefix data, and when being de-encapsulated, the data can be restored according to the corresponding relation of the local index, such that the data can be restored more accurately.

At step 105, the data in the prefix table and the data in the suffix table are written into a preset data encapsulation table, and the data encapsulation table is sent.

Specifically, the data encapsulation table actually includes two parts of data: the data in the prefix table and the data in the suffix table, which are separately stored and do not interfere with each other, and there can be a corresponding relation established between these two parts of data through an index. After the data in the prefix table and the data in the suffix table are all written into the data encapsulation table, the data encapsulation table can be sent out, and sending of the data encapsulation table can be completed through the IGP, or in other ways, which will not be described in detail herein. The data encapsulation table has a style as shown in FIG. 2, which is jointly formed by the prefix table and the suffix table, and there is an invisible corresponding relation established therebetween through the local index.

By utilizing the solution provided by this embodiment, at an encapsulation node, at least two sets of data to be sent may be obtained, and the data includes prefix data and suffix data; obtaining public prefix data may be extracted from the prefix data; a local index may be obtained based on the public prefix data, and the local index and the public prefix data may be written into a preset prefix table; the suffix data and the local index may be written into a preset suffix table; and the data in the prefix table and the data in the suffix table may be written into a preset data encapsulation table, and the data encapsulation table may be sent out. Compared with existing technologies, the embodiment can achieve the effects that the public prefix data is separately stored and one public prefix only needs to be stored once, thus saving a large amount of table entry space while reducing storage burden incurred at nodes.

Figure 3:
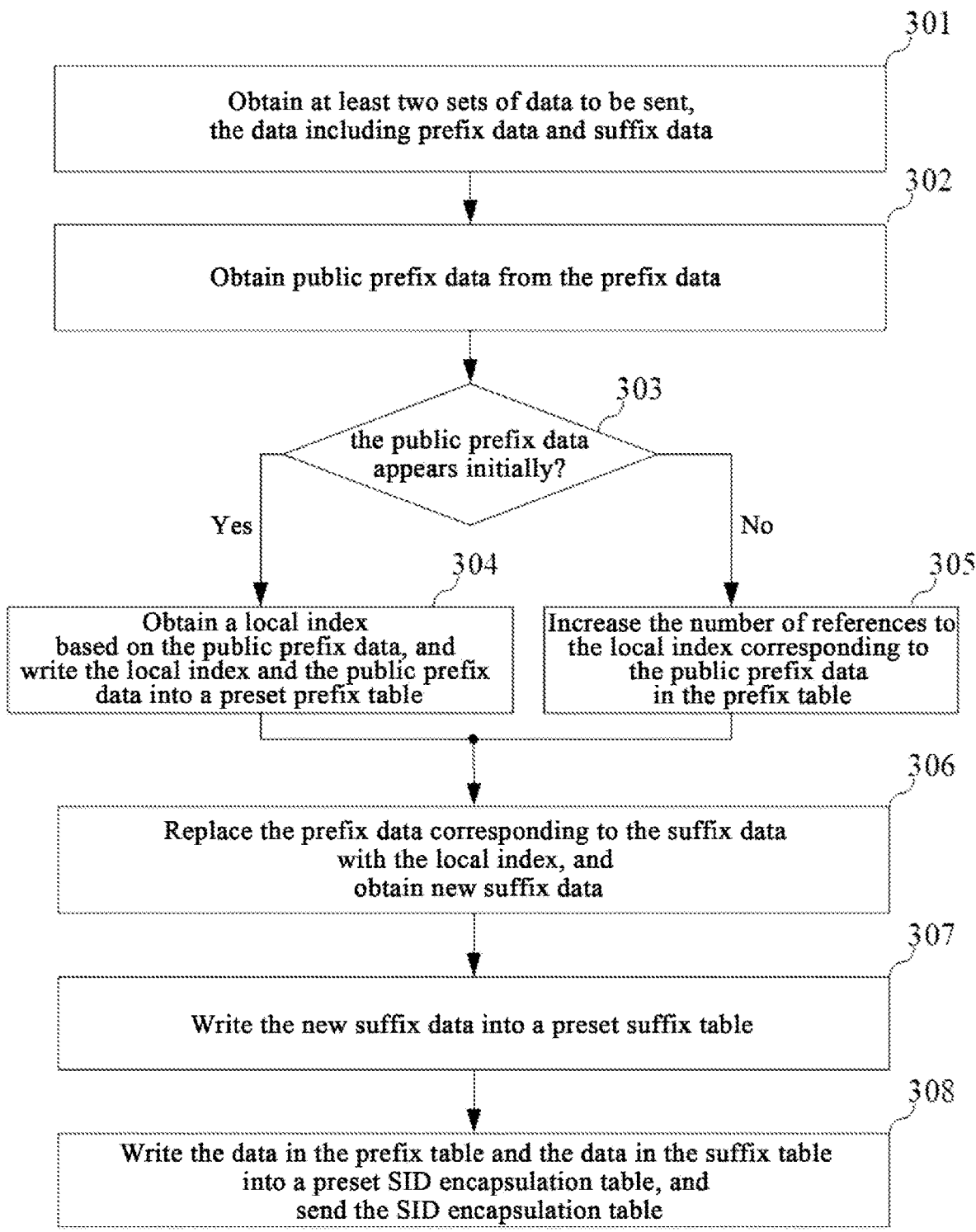
FIG. 3 is a flow chart of a data processing method provided by a second embodiment of the disclosure.

A second embodiment of the disclosure relates to a data processing method, and the embodiment is substantially similar to the first embodiment, except that this embodiment refines steps 103 and 104. As shown in FIG. 3, it in particular includes the following steps 301 to 308.

At step 301, at least two sets of data to be sent are obtained, which includes prefix data and suffix data.

Specifically, the step is substantially similar to step 101 in the first embodiment, which will not be described in detail herein.

At step 302, public prefix data from the prefix data is obtained.

Specifically, the step is substantially similar to step 102 in the first embodiment, which will not be described in detail herein.

At step 303, whether the public prefix data occurs in its initial appearance is determined.

Specifically, each time one public prefix data is obtained, whether the public prefix data has appeared before needs to be determined firstly. If it is the first time the public prefix data appears, then the process proceeds to step 304, or if it is not the first time the public prefix data appears, then the process proceeds to step 305.

At step 304, based on the public prefix data, a local index is obtained, and the local index and the public prefix data are written into a preset prefix table.

Specifically, the step is substantially similar to step 103 in the first embodiment, which will not be described in detail herein.

At step 305, the number of references to the local index corresponding to the public prefix data in the prefix table is increased.

Specifically, as it is not the first time the obtained public prefix appears, which means that prior to this point, the local index has been obtained for the public prefix data, the prefix table does include the public prefix data and the corresponding local index, and increasing the number of references to the local index is equivalent to writing the public prefix data and the local index into the prefix table. Otherwise, assuming that the local index is repeatedly obtained for the public prefix data, it will lead to inaccurate data subjected to subsequent de-encapsulation. In fact, when it is detected that the public prefix data is deleted, the local index corresponding to the deleted public prefix data can be deleted from the prefix table, and the local index can be released to an index resource pool for reallocation.

At step 306, the prefix data corresponding to the suffix data is replaced with the local index, and new suffix data is obtained.

Specifically, the data is composed of the prefix data and the suffix data, and a local index is re-applied for the prefix data, which is then separately stored in a table, so the suffix data also needs to be separately stored. When the suffix data is separately stored, the prefix data corresponding to the suffix data needs to be replaced with the local index corresponding to the prefix data, such that there is an association between the suffix table and the prefix table, which can ensure the accuracy of the de-encapsulated data.

At step 307, the new suffix data is written into a preset suffix table.

Specifically, the data written into the preset suffix table is composed of the suffix data and the local index, in which case the local index is a local index with which the prefix data corresponding to the suffix data is replaced.

At step 308, the data in the prefix table and the data in the suffix table are written into a preset data encapsulation table, and the data encapsulation table is sent.

Specifically, the step is substantially similar to step 104 in the first embodiment, which will not be described in detail herein.

Compared with existing technologies, the solution provided by this embodiment based on the first embodiment can avoid repeated application for the same public prefix data when obtaining the local index, which means that only one public index is applied for the same public prefix data to avoid the use of a plurality of local indexes by the same public prefix data, and can also release the local index corresponding to the public prefix data when the public prefix data is deleted, thereby improving utilization of index resources.

Figure 4:
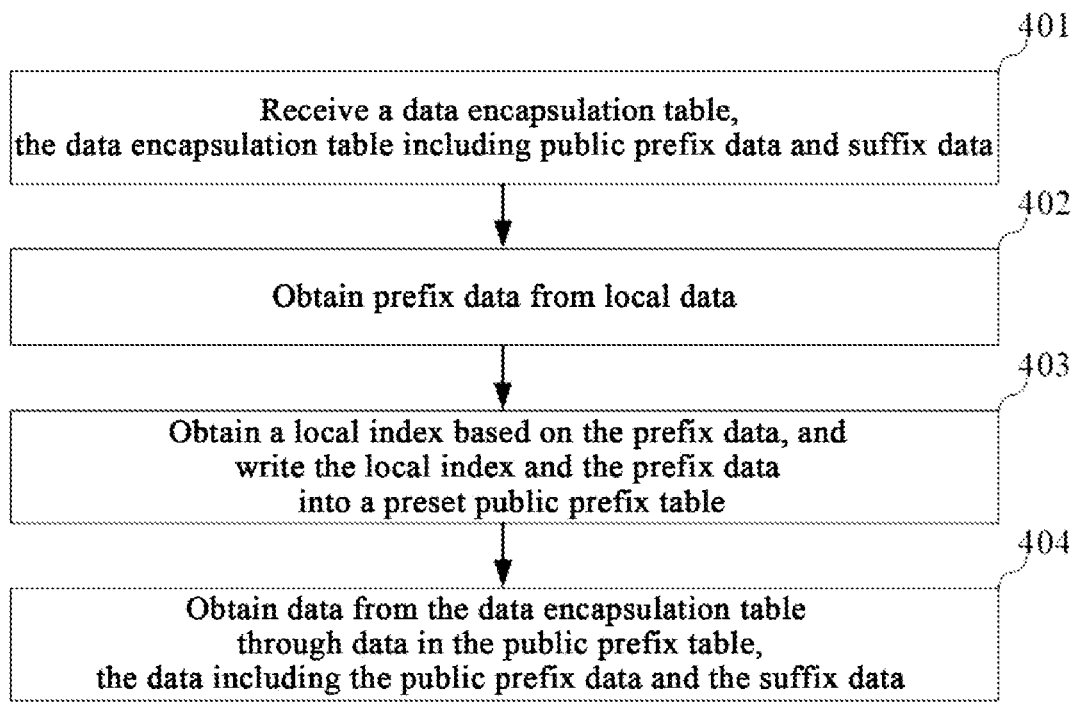
FIG. 4 is a flow chart of a data processing method provided by a third embodiment of the disclosure.

A third embodiment of the disclosure relates to a data processing method, as shown in FIG. 4, in particular including the following steps 401 to 404.

At step 401, a data encapsulation table is received, which includes public prefix data and suffix data.

Specifically, according to the embodiment, the data encapsulation table is received at a de-encapsulation node, and the received data encapsulation table is actually divided into two parts, the first part of which stores the public prefix data and a corresponding local index, and the second part of which stores the suffix data and a corresponding local index. The contents of the two parts can correspond to each other through the local indexes.

At step 402, prefix data is obtained from a local data table.

Specifically, the data is encapsulated in the data encapsulation table, and the prefix data of the local data needs to be obtained from the local data table. "Local" refers to the de-encapsulation node at which the data encapsulation table is received, and the data of the node is similar to data of an encapsulation node. In the process of data generation, all defined data is stored at this node.

At step 403, based on the prefix data, a local index is obtained, and the local index and the prefix data are written into a preset public prefix table.

Specifically, the local index is obtained based on the local prefix data, and then the local index and the prefix data are correspondingly written into the preset public prefix table. The embodiment of this step is similar to step 103 in the first embodiment. The processes of steps 303 to 306 mentioned in the second embodiment of the disclosure can also implemented in this step. The style of the preset public prefix table is similar to that of the prefix table as shown in FIG. 2.

At step 404, data is obtained from the data encapsulation table through data in the public prefix table, where the data includes the public prefix data and the suffix data.

Accordingly, during data de-encapsulation, the encapsulated data can be obtained from the data encapsulation table through the local index, thereby ensuring the accuracy of the encapsulated data.

Figure 5:
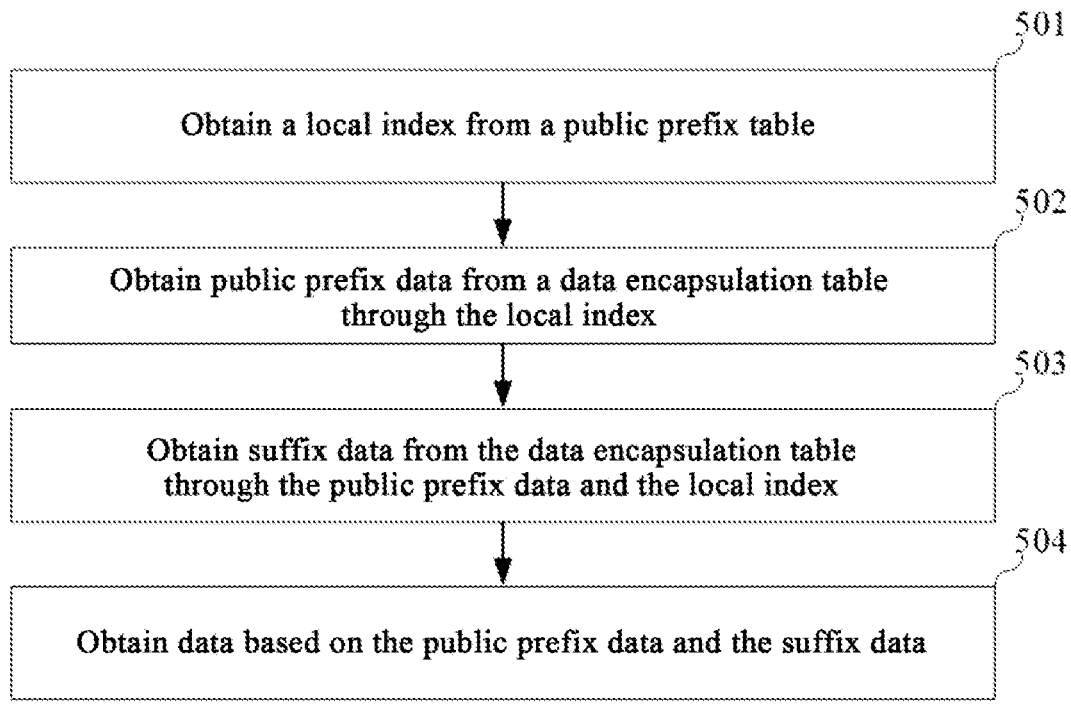
FIG. 5 is a flow chart of step 404 in the data processing method provided by the third embodiment of the disclosure, as shown in FIG. 4.

Specifically, in the implementation, the step of obtaining the encapsulated data from the data encapsulation table through data in the public prefix table, as shown in FIG. 5, further includes the following steps 501 to 504.

At step 501, a local index is obtained from a public prefix table.

Specifically, what is obtained from the public prefix table is actually the local index and the corresponding relation between the local index and prefix data. Taking the public prefix table shown in FIG. 2 as an example, when the obtained local index is IDX1, the corresponding relation between the local index and public prefix 1 is also obtained, thus when the public prefix data is subsequently obtained from the data encapsulation table, it is possible to judge whether the corresponding relation is correct.

At step 502, public prefix data is obtained from a data encapsulation table through the local index.

Specifically, there is a corresponding relation between the obtained local index and the prefix data, and the local index is used to match the data in the data encapsulation table, thus obtaining the public prefix data corresponding to the local index.

At step 503, suffix data is obtained from the data encapsulation table through the public prefix data and the local index.

Specifically, after the public prefix data is obtained through the local index, the suffix data is extracted according to the corresponding relation between the local index and the public prefix data as well as the corresponding relation between the local index and the suffix data.

At step 504, data is obtained based on the public prefix data and the suffix data.

Specifically, the data finally obtained in step 503 actually includes three parts, i.e., the public prefix data, the local index and the suffix data. A corresponding relation between the prefix data and the suffix data is actually established through the local index, and through such a corresponding relation, the public prefix data and the suffix data can be combined together to form one complete piece of data, making it back to the appearance when being encapsulated. Taking the data encapsulation table shown in FIG. 2 as an example, when the local index IDX1 is used to de-encapsulate the data encapsulation table, the data obtained includes public prefix 1, IDX1, suffix data 1 and suffix data 2, and according to corresponding relations between them, the finally de-encapsulated data are data in a format of "Public Prefix 1+Suffix Data 1" and data in a format of "Public Prefix Data 1+Suffix Data 2".

Compared with existing technologies, the solution provided by the embodiment can ensure the accuracy of the de-encapsulated data by completing the de-encapsulation of the data encapsulation table according to the local index obtained based on the local data, and obtaining, during data de-encapsulation, the encapsulated data through the corresponding relation between the local index and the public prefix data as well as the corresponding relation between the public prefix data and the suffix data.

Figure 6:
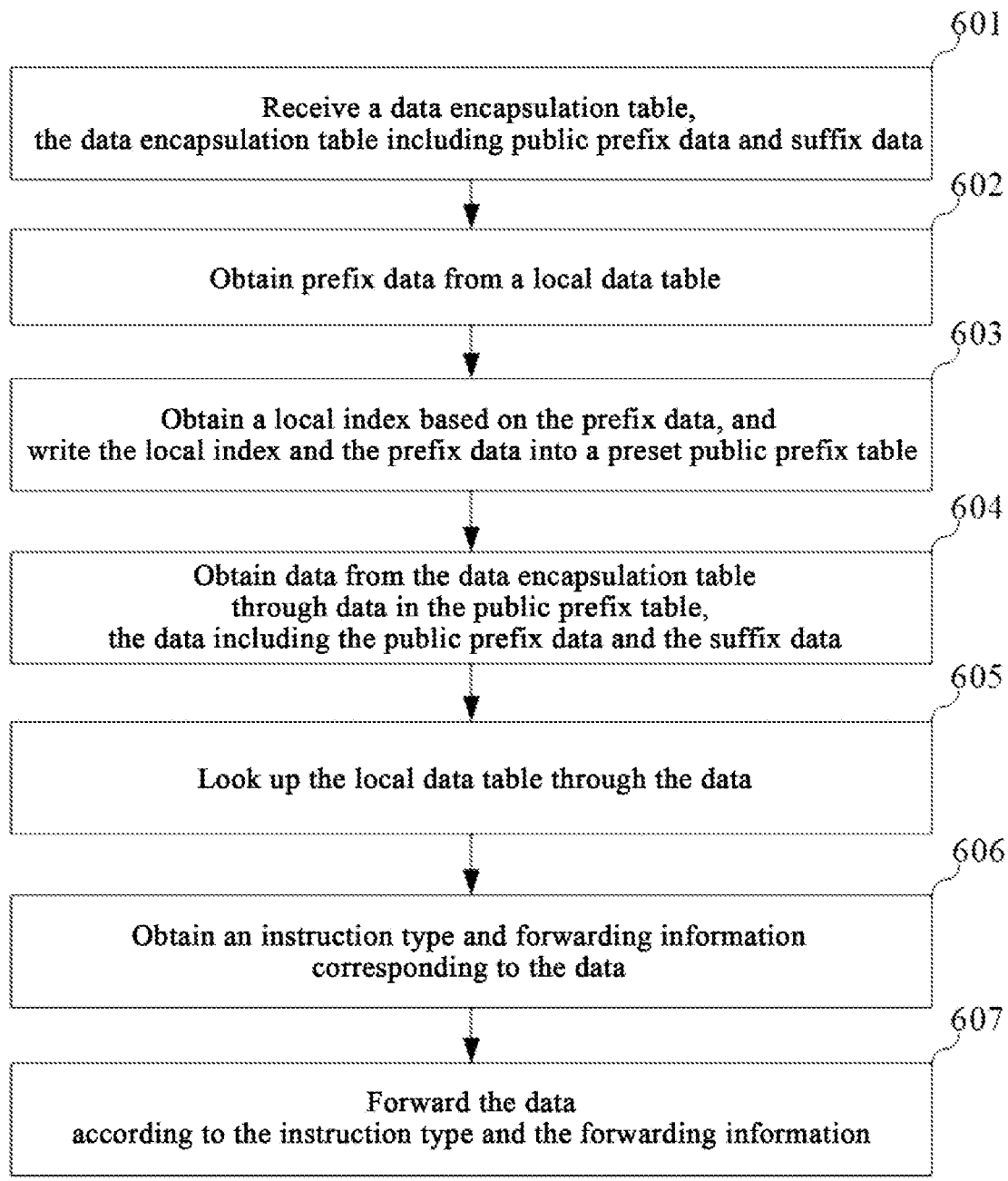
FIG. 6 is a flow chart of a data processing method provided by a fourth embodiment of the disclosure.

A fourth embodiment of the disclosure relates to a data processing method, and the embodiment is substantially similar to the third embodiment, except that after obtaining the data, forwarding the data is also implemented, which is specifically shown in FIG. 6.

At step 601, a data encapsulation table is received, which includes public prefix data and suffix data.

Specifically, the step is substantially similar to step 401 in the third embodiment, which will not be described in detail herein.

At step 602, prefix data is obtained from a local data table.

Specifically, the step is substantially similar to step 402 in the third embodiment, which will not be described in detail herein.

At step 603, based on the prefix data, a local index is obtained, and the local index and the prefix data are written into a preset public prefix table.

Specifically, the step is substantially similar to step 403 in the third embodiment, which will not be described in detail herein.

At step 604, data is obtained from the data encapsulation table through data in the public prefix table, where the data includes the public prefix data and the suffix data.

Specifically, the step is substantially similar to step 404 in the third embodiment, which will not be described in detail herein.

At step 605, the local data table is looked up through the data.

Specifically, in the process of defining data at each node, a local data table will be set at each node to store all the data defined at the node.

At step 606, an instruction type and forwarding information corresponding to the data are obtained.

Specifically, the local data table includes the instruction type and forwarding information corresponding to each data. For instance, taking SID data as an example, if the type corresponding to the SID data is End SID, it represents an Endpoint SID to identify a certain destination address prefix in a network, and the End SID is diffused to other network elements through the IGP, which is globally visible and valid. Alternatively, if the type corresponding to the SID data is End.X SID, the instruction of such a type represents three layers of cross-connected Endpoint SIDs to identify a certain link in the network, and End.X SID is diffused to other network elements through the IGP, which is globally visible and valid. Alternatively, if the type corresponding to the SID data is End.DT4 SID, it represents Endpoint SID of a PE type to identify a certain IPv4 VPN example in the network, the forwarding action corresponding to End.DT4 SID is de-encapsulating a packet and looking up a routing table of the IPv4 VPN example for forwarding, and End.DT4 SID is used in a Virtual Private Network (VPN) scenario, which is equivalent to an IPV4 VPN label. Alternatively, if the type corresponding to the SID data is End.OTP SID (OAM Endpoint with Timestamp and Punt), it represents an SID of an OAM type to carry out timestamp and translation behaviors on an OAM packet, and End.OTP SID is mainly used for network diagnosis Ping/Tracert scenarios.

At step 607, the data is forwarded according to the instruction type and the forwarding information.

Compared with existing technologies, the embodiment can complete the forwarding of the data according to the instruction type and the forwarding information of the data after the data is de-encapsulated, improving the applicability of the disclosed solution.

In addition, it should be understood that the steps of various methods above are given only for the purpose of describing clearly, and during implementation, the steps can be combined into one step, or certain steps can be split into multiple steps, both will fall within the scope of the disclosure, as long as a consistent logical relationship is maintained. Addition of insignificant modifications or introduction of insignificant designs to the algorithm or process will fall within the scope of the disclosure, without changing the basic design of the algorithm and process.

Figure 7:
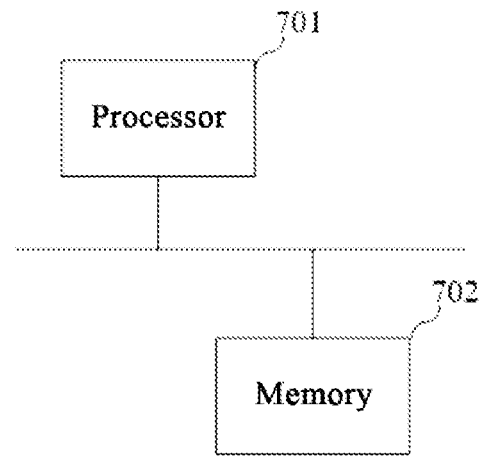
FIG. 7 is a schematic structural diagram of an encapsulation node provided by a fifth embodiment of the disclosure.

A fifth embodiment of the disclosure relates to an encapsulation node, as shown in FIG. 7, including at least one processor 701 and a memory 702 in communication connection with the at least one processor. The memory 702 stores instructions executable by the at least one processor 701, and the instructions, when being executed by the at least one processor 701, cause the at least one processor 701 to execute the data processing method according to any one of the above embodiments.

Figure 8:
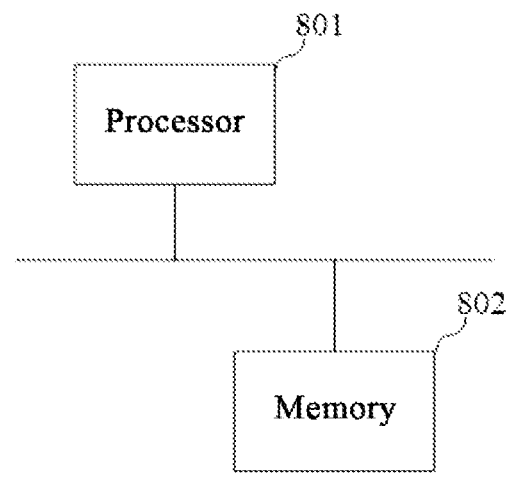
FIG. 8 is a schematic structural diagram of a de-encapsulation node provided by a sixth embodiment of the disclosure.

A sixth embodiment of the disclosure relates to a de-encapsulation node, as shown in FIG. 8, including at least one processor 801; and a memory 802 in communication connection with the at least one processor 801. The memory 802 stores instructions executable by the at least one processor 801, and the instructions, when being executed by the at least one processor 801, cause the at least one processor 801 to execute the above data processing method according to any one of the above embodiments.

In the fifth and the sixth embodiments of the disclosure, the memory and the processor are connected by a bus, which can include any number of interconnected buses and bridges, and which connects the one or more processors to various circuits of the memory. The bus can also connect various other circuits such as peripheral equipment, voltage stabilizer and power management circuits, which are well-known in the field, and thus will not be described in detail herein. A bus interface is provided between the bus and a transceiver. The transceiver can be either a single component or multiple components, such as a plurality of receivers and transmitters, providing units for communicating with various other devices on a transmission medium. Data processed by the processor is transmitted on a wireless medium via an antenna, which in turn receives and transmits the data to the processor.

The processor is responsible for bus managing and general processing, and can also provide a variety of functions including timing, peripheral interface, voltage regulation, power management, and other control functions. The memory can be used to store data used by the processor during its operation.

Figure 9:
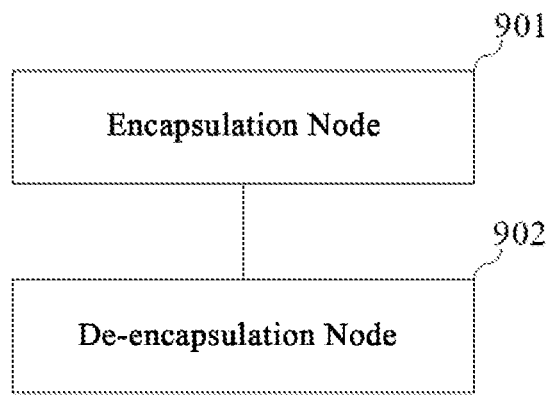
FIG. 9 is a schematic structural diagram of a data processing system provided by a seventh embodiment of the disclosure.

A seventh embodiment of the disclosure relates to a data processing system, as shown in FIG. 9, including an encapsulation node 901 and a de-encapsulation node 902.

The encapsulation node 901 is configured to receive data to be sent, to encapsulate the data to be sent into a data encapsulation table, and to send the data encapsulation table. The de-encapsulation node 902 is configured to receive the data encapsulation table and de-encapsulate the obtained data encapsulation table, to obtain data, and to forward the data according to the type of the data and an instruction.

It should be noted that all nodes involved in the seventh embodiment are logic modules. In practical application, a logic unit can be a physical unit or part of the physical unit, or can be implemented as a combination of multiple physical units. In addition, in order to emphasize the innovation of the disclosure, the seventh embodiment does not introduce units that are less closely related to solving the technical problems presented in the disclosure, which however does not indicate that other units do not exist in the present embodiment.

It may be understood by those of ordinary skill in the art that the above embodiments are specific embodiments for implementing the disclosure, and that various changes can be made to them in form and detail in practical application without departing from the spirit and scope of the disclosure.

What is claimed is:

1. A data processing method, comprising:
obtaining at least two sets of data to be sent, wherein the data comprises prefix data and suffix data;
obtaining public prefix data from the prefix data;
obtaining a local index based on the public prefix data, and writing the local index and the public prefix data into a preset prefix table;
writing the suffix data and the local index into a preset suffix table; and
writing the data in the prefix table and the data in the suffix table into a preset data encapsulation table, and sending the data encapsulation table.

2. The data processing method according to claim 1, wherein the step of obtaining a local index based on the public prefix data, and writing the local index and the public prefix data into a preset prefix table comprises:
determining whether the public prefix data occurs in its initial appearance;
obtaining, if the public prefix data appears initially, the local index based on the public prefix data, and writing the local index and the public prefix into the prefix table; or
increasing, if the public prefix data appears non-initially, a number of references to the local index corresponding to the public prefix data in the prefix table.

3. The data processing method according to claim 1, wherein the step of obtaining a local index based on the public prefix data, and writing the local index and the public prefix data into a preset prefix table further comprises:
reducing, when the public prefix data is deleted, a number of references to the local index corresponding to the public prefix data in the public prefix data, wherein when the number of references to the local index is 0, the local index corresponding to the public prefix data in the prefix table is deleted.

4. The data processing method according to claim 1, wherein the step of writing the suffix data and the local index into a preset suffix table comprises:
replacing the prefix data corresponding to the suffix data with the local index to obtain new suffix data, wherein the new suffix data comprises the local index and the suffix data; and
writing the new suffix data into the preset suffix table.

5. A data processing method, comprising:
receiving a data encapsulation table, wherein the data encapsulation table comprises public prefix data and suffix data;
obtaining prefix data from a local data table;
obtaining a local index based on the prefix data, and writing the local index into a preset public prefix table; and
obtaining data from the data encapsulation table through data in the preset public prefix table, wherein the data comprises the public prefix data and the suffix data.

6. The data processing method according to claim 5, wherein the step of obtaining data from the data encapsulation table through data in the preset public prefix table comprises:
obtaining the local index from the public prefix table;
obtaining the public prefix data from the data encapsulation table through the local index;
obtaining the suffix data from the data encapsulation table through the public prefix and the local index; and
obtaining the data based on the public prefix data and the suffix data.

7. The data processing method according to claim 5, wherein after the step of obtaining data from the data encapsulation table through data in the preset public prefix table, the method further comprises:
looking up a local data table through the data;

obtaining an instruction type and forwarding information corresponding to the data; and forwarding the data according to the instruction type and the forwarding information.

8. A data processing system, comprising:

an encapsulation node, which comprises at least one process and a memory in communication with the at least one processor, wherein the memory stores instructions executable by the at least one processor, which instructions, when being executed by the at least one processor, cause the at least one processor to execute a data processing method, comprising:

obtaining at least two sets of data to be sent, wherein the data comprises prefix data and suffix data;

obtaining public prefix data from the prefix data;

obtaining a local index based on the public prefix data, and writing the local index and the public prefix data into a preset prefix table;

writing the suffix data and the local index into a preset suffix table; and writing the data in the prefix table and the data in the suffix table into a preset data encapsulation table, and sending the data encapsulation table; and a de-encapsulation node, which comprises at least one process and a memory in communication with the at least one processor, wherein the memory stores instructions executable by the at least one processor, which instructions, when being executed by the at least one processor, cause the at least one processor to execute a data processing method, comprising:

receiving a data encapsulation table, wherein the data encapsulation table comprises public prefix data and suffix data;

obtaining prefix data from a local data table;

obtaining a local index based on the prefix data, and writing the local index into a preset public prefix table; and obtaining data from the data encapsulation table through data in the preset public prefix table, wherein the data comprises the public prefix data and the suffix data.

9. The data processing system according to claim 8, wherein the encapsulation node is configured to receive data to be sent, to encapsulate the data to be sent into a data encapsulation table and to send the data encapsulation table.

10. The data processing system according to claim 9, wherein the de-encapsulation node is configured to receive the data encapsulation table and de-encapsulate the obtained data encapsulation table, to obtain data, and to forward the data according to a type of the data and an instruction.

* * * * *